US005146237A

United States Patent [19]

Taguchi et al.

[11] Patent Number: 5,146,237

[45] Date of Patent: Sep. 8, 1992

[54] RESISTIVE SHEET TRANSFER PRINTING AND ELECTRODE HEAD

[75] Inventors: Nobuyoshi Taguchi; Akihiro Imai, Both of Ikoma; Hiromu Matsuda; Tetsuji Kawakami, both of Katano; Keiichi Yubakami, Suita, all of Japan

[73] Assignee: Matushita Electric Industrial Co., Ltd., Osaka, Japan

[21] Appl. No.: 463,481

[22] Filed: Jan. 11, 1990

[30] Foreign Application Priority Data

| | | | |
|---|---|---|---|
| Jan. 17, 1989 | [JP] | Japan | 1-008211 |
| May 8, 1989 | [JP] | Japan | 1-114726 |
| Sep. 28, 1989 | [JP] | Japan | 1-253358 |

[51] Int. Cl.$^5$ .......... G01D 15/10

[52] U.S. Cl. .......... 346/1.1; 346/76 PH; 346/155

[58] Field of Search .......... 346/76 PH, 155

[56] References Cited

U.S. PATENT DOCUMENTS 4,425,569 1/1984 Kawanishi et al. .......... 346/76 PA

FOREIGN PATENT DOCUMENTS

| | | |
|---|---|---|
| 0031453 | 7/1981 | European Pat. Off. . |
| 61-57388 | 3/1986 | Japan . |
| 63-94887 | 4/1988 | Japan . |
| 63-191684 | 8/1988 | Japan . |
| 126496 | 1/1989 | Japan . |

OTHER PUBLICATIONS

"Surface Coating for the Reduction of Contact Resistance in Resistive Ribbon Printing", K. K. Shih & T. C. Chieu, Proceedings of the SID, 28/1, pp. 87 to 91, 1987.

*Primary Examiner*—Joseph W. Hartary
*Assistant Examiner*—Gerald E. Preston
*Attorney, Agent, or Firm*—Stevens, Davis, Miller & Mosher

[57] ABSTRACT

A method of resistive sheet transfer recording is disclosed, in which the thermal diffusion coefficient of a resistive sheet (1) in the range of 1 to $100\times10^{-6}$ m$^2$/s is combined with that of an electrode head (2) in the range of 0.1 to $50\times10^{6}$ m$^2$/s, thereby making it possible to form a high-quality image at high sensitivity and high speed.

8 Claims, 3 Drawing Sheets

RESISTIVE SHEET TRANSFER PRINTING AND ELECTRODE HEAD

BACKGROUND OF THE INVENTION

1. Field of the Invention

The present invention relates to a method of resistive sheet transfer printing and an electfode head used in the field of image-forming technique for producing a high-quality image with high speed and sensitivity.

2. Description of the Prior Art

A high-speed production of a full-color image is suitably realized by a resistive sheet color transfer printing using a recording member (including an ink sheet having a resistive sheet carrying thereon ink containing a pigment or a sublimable dye and an image-receiving member having a color development layer in the surface thereof) and an electrode head. The electrode head has a multistylus thereof held by a plurality of insulating support members generally made of a thermosetting resin, glaze or ceramics such as alumina. The same material is used for both inside and outside of electrode pairs.

A resistive sheet transfer printing effected with a molten ink as a color material to realize a binary recording image at high speed, uses a film as a resistive sheet made of a polycarbonate resin containing carbon. This resistive sheet has a thermal diffusion coefficient of approximately $10^5$ $m^2/s$. Also, in order to reduce the contact resistance between the electrode head and the resistive sheet, a conductive film is deposited by evaporation or the like process as a second resistive layer on the surface of the resistive sheet (first resistive layer). According to a reference (KKC, TCU, Proceedings of the SID, 28/1, pp. 87 to 91, 1987), the contact resistance is expected to decrease by forming a second resistive layer of a Cr-N thin film having a specific resistivity of 0.03 ohm·cm or less and a thickness of 1000 Å or less. The multilayered resistive sheet thus formed has a thermal diffusion coefficient of $10^{-6}$ $m^2/s$ at most.

In the gradation recording using a sublimative dye as a color material for producing a high-quality full-color image, the high recording energy requirement poses the following problems in a conventional resistive sheet transfer recording system:

(1) When a resistive sheet of polycarbonate containing carbon is used in contact with an electrode head for recording, the low heat resistance and thermal sliding characteristic causes a smear on the head surface and deteriorates the image quality. In the case where a second inorganic-film resistive layer is deposited by evaporation, on the other hand, in spite of the decreased contact resistance, the especially inferior thermal sliding characteristic, combined with the failure to reduce the friction coefficient between the resistive sheet and the heads, still causes a head smear. This tendency is conspicuous especially for the relative-speed multiple recording system (which effectively uses a transfer member by delaying the running speed cf a transfer member as compared with the speed of a recording paper) and is accompanied by a considerable deterioration in the thermo-mechanical and electric characteristics of the resistive sheet.

(2) In the case where the electrode head is configured of a stylus electrode and a common electrode in opposed relationship to each other to record a signal current in parallel to a heat-generating substrate, the current density distribution is concentrated in the vicinity of the stylus and therefore large homogeneous recording dots are not obtained, thereby making the system unsuitable for gradation recording.

(3) The thermal diffusion coefficient of the insulating support member of the head and the resistive sheet is not optimized. Nor are high speed and high sensitivity attained taking heat storage control into consideration.

If an insulating support member small in thermal diffusion coefficient is used for the electrode head, sensitivity would be improved but the color of a recorded image would become less clear and the resolution thereof would be reduced due to heat storage. The use of an insulating support member large in thermal diffusion coefficient, by contrast, would deteriorate the sensitivity at the sacrifice of the features of resistive sheet transfer printing. Further, heat pulses generated as a result of applying a signal current to the electrode pairs are concentrated in the vicinity of the electrodes of the resistive sheet. This makes it impossible to produce homogeneous recording dots and causes a corrosion of the train of positive electrodes.

SUMMARY OF THE INVENTION

An object of the present invention is to obviate the above-mentioned problems of the conventional systems.

Another object of the present invention is to provide a method of resistive sheet transfer printing and electrode heads for producing a high-quality image at high speed and high sensitivity by use of a resistive sheet in contact with the electrode head.

According to one aspect of the present invention, there is provided a method of resistive sheet transfer recording in which a resistive sheet having a thermal diffusion coefficient of $(1 \text{ to } 100)\times 10^{-6}$ $m^2/s$ is combined with insulating support member for the electrode head having a thermal diffusion coefficient of $(0.1 \text{ to } 50)\times 10^{-6}$ $m^2/s$, and the friction coefficient of the single surface of the electrode head with the resistive sheet is 0.1 or less.

According to another aspect of the present invention, there is provided a method of resistive sheet transfer recording using a recording member and an electrode head with electrode pairs embedded in opposed relationship in insulating support members, in which the insulating support member of the electrode head outside of the electrode pairs on recording member exit or feed-out side has a larger thermal diffusion coefficient than the insulating support member inside the electrode pair or outside the electrode pair on recording member insertion side. Further, the method of resistive sheet transfer printing according to this aspect uses an electrode head in which the sectional area of the electrode train on recording member exit side is larger than that of the corresponding electrode train on recording member insertion side.

According to the present invention, the following features are realized:

(1) A high-speed, high-sensitivity full-color recording at the recording speed of 4 ms per line and recording energy of 2 $J/cm^2$.

(2) The relative speed ratio of $n=10$ obtained under the aforementioned recording conditions (3) A stable resistive sheet free of head dirts (4) Large homogeneous recording dots (5) Clear, sharp image (6) No electrode corrosion after long continuous recording

BRIEF DESCRIPTION OF THE DRAWINGS

The foregoing and other objects, features and advantages of the invention will be made clearer from description of preferred embodiments referring to attached drawings in which.

DESCRIPTION OF THE PREFERRED EMBODIMENT

When a signal current is supplied to electrode pairs, Joule heat is generated in a corresponding resistive sheet and dyes are transferred to an image-receiving member for recording. If the thermal diffusion coefficient of an insulating support member of the electrode head is large, the high-speed responsiveness would be satisfactory but heat efficiency would be deteriorated. If the thermal diffusion coefficient is small, by contrast, the heat efficiency would be improved while heat storage makes high-speed recording impossible. Even an electrode head small in thermal diffusion coefficient, however, permits a thermally efficient high-speed, high-sensitivity recording with the heat storage of the head and resistive sheet dampened if the thermal diffusion coefficient of the resistive sheet in contact with the electrode head is increased. Also, since heat pulses from the head are not concentrated in the vicinity of the stylus electrode but are distributed uniformly between opposed electrodes, smooth gradation recording is assured.

Further, if the high-temperature friction coefficient between the head and resistive sheet is reduced, the head dirt particles by the fusion of the resin of the resistive sheet is also reduced, thereby producing uniform recording dots.

The aforementioned objects may be realized also by a configuration that will be described. Specifically, if the thermal diffusion coefficient of the insulating support members inside the electrode pairs and on the resistive sheet insertion side of the electrode head is reduced, the heat generated in the resistive sheet is effectively utilized for dye transfer thereby to permit high-sensitivity recording. In the process, the extraneous heat stored in the vicinity of the resistive sheet providing a heat source is dissipated by being transmitted to the insulating support member larger in thermal diffusion coefficient on the resistive sheet supply side of the head as a result of the feeding of the resistive sheet, and a high-quality image not affected by heat storage is produced. This phenomenon has a great effect on the high-speed recording operation.

A specific configuration of the present invention will be explained with reference to a first embodiment.

Figure 1:
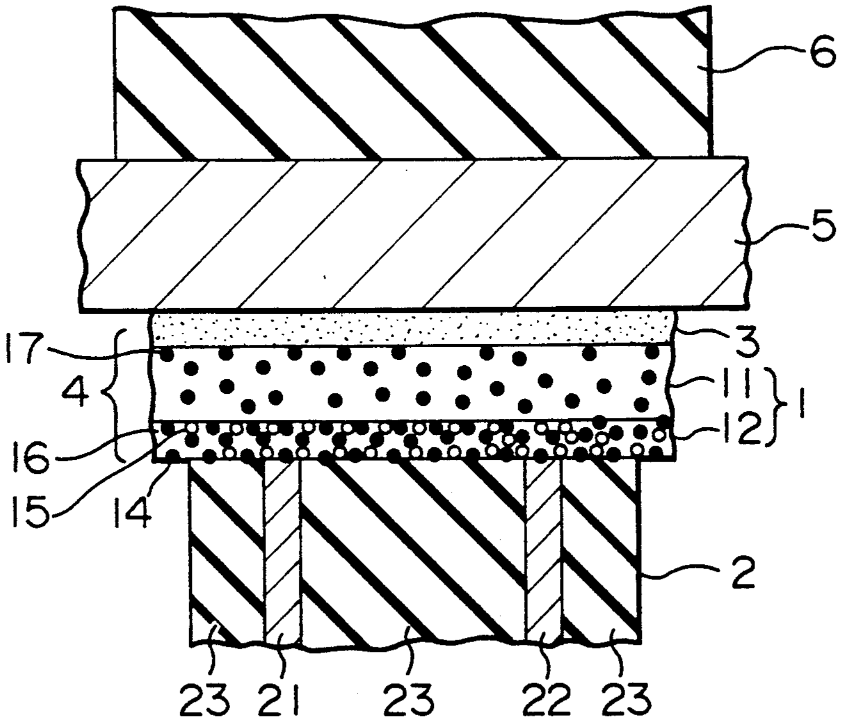
FIG. 1 is a sectional view of a configuration according to a first embodiment of the present invention.
Figure 2:
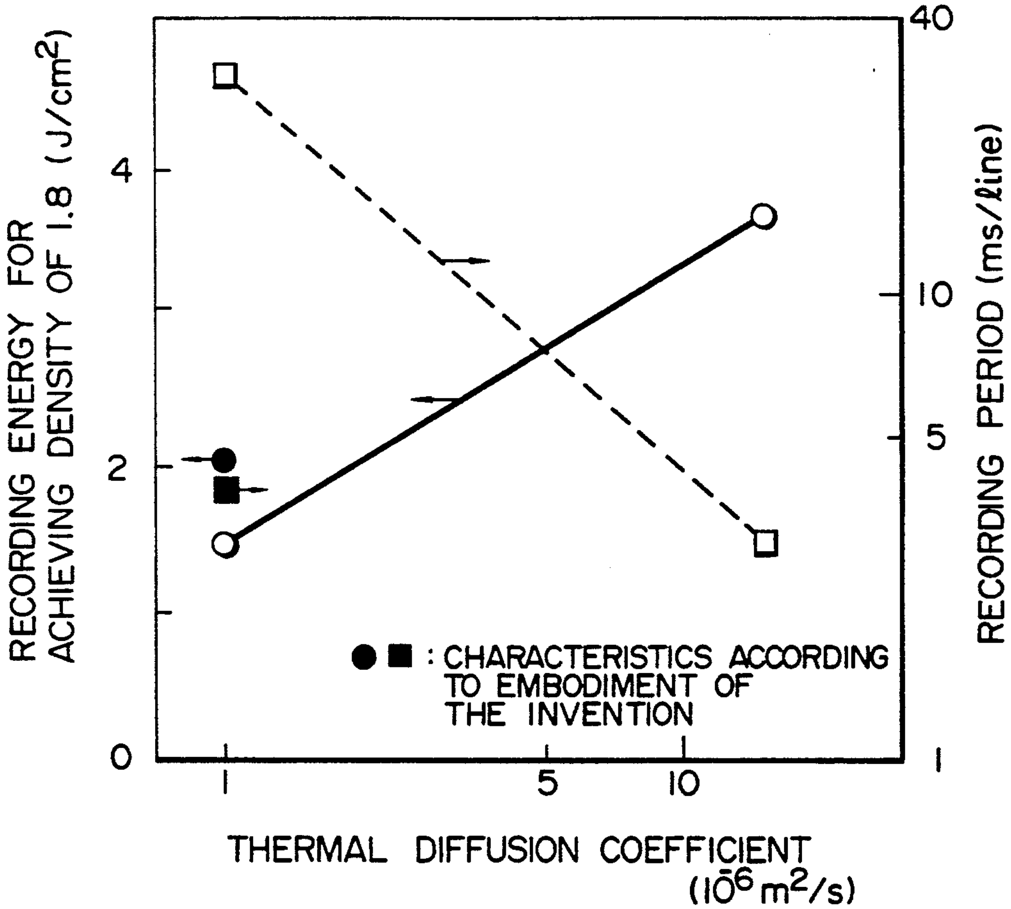
FIG. 2 is a diagram comparing the characteristics of the first embodiment of the present invention with those of a conventional configuration.

A sectional view of a configuration according to a first embodiment of the present invention is shown in FIG. 1, and a comparison of characteristics between a conventional system and the first embodiment in FIG. 2. Reference numeral 1 designates a resistive sheet, numeral 2 an electrode head, numeral 3 a color material layer, numeral 4 a transfer member, numeral 5 an image-receiving paper and numeral 6 a platen.

The resistive sheet 1 includes a first resistive layer 11 and a second resistive layer 12. The first resistive layer 11 is comprised of a resistive film formed by mixing a heat-resistant resin with conductive particles 17 of carbon or the like. This heat-resistive resin is made up of a film-formable resin such as polyimide, alamide, polycarbonate, polyester, polyphenyl sulfide or polyether ketone. This resistive film, which is formed into the thickness of about 4 to 10 microns and the surface resistance of about 1 K-ohms, contains 10 to 30% carbon or the like, and therefore the surface thereof is roughened with the film interior rendered porous for a reduced thermomechanical strength.

The second resistive layer 12, which is intended to compensate for the problem of the first resistive layer 11, requires a high heat resistance and smoothness with a proper degree of resistance and surface property, and is configured of at least conductive inorganic particles 14, non-conductive inorganic particles 15 and a heat-resistant resin 16. An organic unguent may also be contained. The second resistive layer 12 has a thickness of about 0.2 to 6.0 microns with the surface thereof roughened in fine texture by use of inorganic particles and formed into a surface resistance higher by one order than the first resistive layer. The second resistive layer 12, if used as a main heat-generating layer, uses a smaller surface resistance. The heat-resistant resin 16 has the characteristic of setting against heat or ultraviolet ray. More specifically, the resin 16 is made of epoxy, melamine, urethane, various acrylates, silicones (hardcoating material of organo-alkoxysilane) or the product of the coupling or graft reaction of silane or titanate with acrylates. The conductive inorganic particles 14 are generally composed of carbon black (ketjen black), and metal particles or graphite of the order of submicrons or less in size are another choice. The non-conductive inorganic particles 15 are made of silica, alumina, titanium oxide, silicon carbide or the like abrasive of the order of submicrons or less or a solid unguent such as molybdenum disulfide or talc. The organic unguent used includes a reactive or non-reactive silicone oil or a surface active agent of silicone or fluorine type. These components of the second resistive layer are prepared and coated as a material containing the parts 14, 15 and 16 in the approximate ratio of 1:1:1 by weight respectively. The weight ratio, however, is not limited to this figure.

The color material layer 3 is formed of at least a sublimable dye and a dyeing resin. The transfer member 4 includes the resistive sheet 1 and the color material layer 3.

The electrode head 2 is formed of a stylus 21, a common electrode 22 and a support member 23 into a line head. The electrodes 21, 22 are constructed of copper, tungsten, titanium, brass or the like. The support member 23 is composed of ceramics (boron nitride, mica-ceramics or the like) larger in abrasion property and cleavage than the electrodes. The resolution of the electrodes is 6 to 16 dots/mm.

The signal current applied between the electrodes 21, 22 flows through the first resistive layer in parallel to the film thereof in the direction perpendicular to the second resistive layer. The recording conditions prevailing under this setting include a pulse width of 1 ms applied to each dot, a recording cycle of 4 ms for each line and a peak temperature of 300° to 400° C. at the heat generating section. The current density distribution, i.e., the peak temperature distribution is especially great direct under the stylus electrode. The transfer member 4 and the image-receiving member 5 run between platen and head under this high temperature and high pressure (3 kg/100 cm). In the process, electrical contact with the electrodes is effected by conductive inorganic particles 14 roughened in fine texture, and the non-conductive inorganic particles 15 are used to clean off the dirt particles from the components of the second resistive layer 12 generated instantaneously on the head, while at the same time attaching an interface smoothness between the head and the resistive layers. The organic unguent contained in the first and second resistive layers oozes out into the interface to help improve the smoothness under high temperatures. The resistive layer 12 containing a great proportion of inorganic particles has a sufficient heat resistance. Dirt particles deposited on the heads hampers the gradation recording of high image quality. Experiments show that the friction coefficient of 0.2 or less at room temperature is required in order to assure smooth running and recording between the head and resistive sheet. The head may be constructed in such a manner that the unguent oozes out from the head surface under high temperatures in order to promote smooth recording.

The thermal diffusion coefficient A (A=k/dc, k: Heat conductivity, d: Density, c: Specific heat) of the second resistive layer, on the other hand, has a value of 1 to 100 with $10^{-6}$ $m^2/s$ as a unit. The value A of the first resistive layer is 0.2 or less. The value A of alamide film containing no carbon is 0.05, while that of aluminum, copper, tungsten, silicon, silicon carbide or the like is 20 to 150. In this way, the second resistive layer has a value A similar to metal so that the high peak temperature direct under the stylus is diffused and reduced. As a result, large uniform recording dots are obtained, while at the same time reducing the thermal burden on the components of the first and second resistive layers.

A large thermal diffusion coefficient of the insulating support members of the electrode head, regardless of whether the corresponding coefficient of the resistive sheet is large or small, results in a superior high-speed response but requires a large recording energy due to a low thermal efficiency. The use of a conventional resistive sheet small in thermal diffusion coefficient, in spite of the high thermal efficiency obtained for the head having insulating support members small in thermal diffusion coefficient, would cause a fogging of the recorded image due to the heat storage, thus making the system unsuitable for high-speed recording. If a resistive sheet large in thermal diffusion coefficient is used as described above, however, the heat stored in the head is absorbed to permit high-speed, high-sensitivity recording. The manner in which this process is made possible is shown in FIG. 2. The insulating support members comparatively large in thermal diffusion coefficient include boron nitride (A=15), alumina (A=6), etc., and those comparatively small in thermal diffusion coefficient include glaze (A=0.5), mica-ceramics (A=1), etc. A combination of thermal diffusion coefficients of the resistive sheet and the insulating support members mentioned below is recommended.

| | |
|---|---|
| Value A of resistive sheet: | 1 to 100 |
| Value A of insulating support members of electrode head: | 0.1 to 50 |

More specific examples will be explained.

(1) Electrode head: A6-size line head having a resolution of 6 dots/mm (stylus electrode made of tungsten), including insulating support members of micaceramics. Applied pulse width of 1 ms, a recording cycle of 4 ms/line and a pressure of 3 kg/100 mm for uniform-speed or relative-speed recording (speed ratio n of 1 to 10).

(2) First resistive layer: Alamide resin mixed with carbon and formed into a thickness of 6 microns and a surface resistance of 1 K-ohms.

(3) Second resistive layer: Formed on the first resistive layer into a thickness of 4 μm(microns) and constructed of solid components including, by weight, one part of black 10 mμ in primary particle size, one part of silicon dioxide 10 mμ in primary particle size prepared by vapor phase growth method, 0.8 parts of epoxy resin, 0.1 parts of isocyanate, and 0.05 parts of dimethyl silicone oil.

(4) Color material layer: Formed into a thickness of 1 micron and constructed of solid components including, by weight, one part of cyane color sublimable dye of indoanilin, and one part of polycarbonate resin.

(5) Image-receiving member: Formed into a thickness of 8 microns and constructed of solid components including, by weight, one part of polyester resin and 0.2 parts of silica on a milky PET film 100 microns thick.

A recording test conducted under the aforementioned conditions shows that as indicated by black marks in FIG. 2, a smooth gradation recording characteristic is obtained by relative speed process at a recording cycle of 4 ms/line and a recording energy of 2 $J/cm^2$ without any fogging of an image. The image thus recorded has a quality equivalent to the one obtained in a dye transfer recording with a thermal head used as recording means. Also, an A6-size full-color image is produced in about ten seconds by use of magenta and yellow in addition to the above-mentioned dye.

Now, a second embodiment will be explained.

Figure 3:
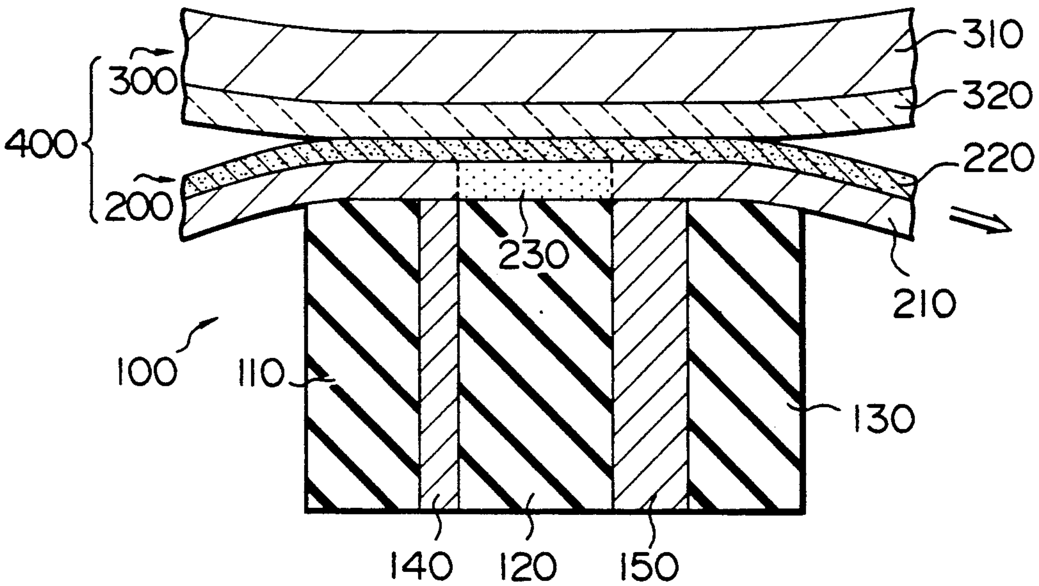
FIG. 3 is a sectional view of a configuration according to a second embodiment of the invention.
Figure 4:
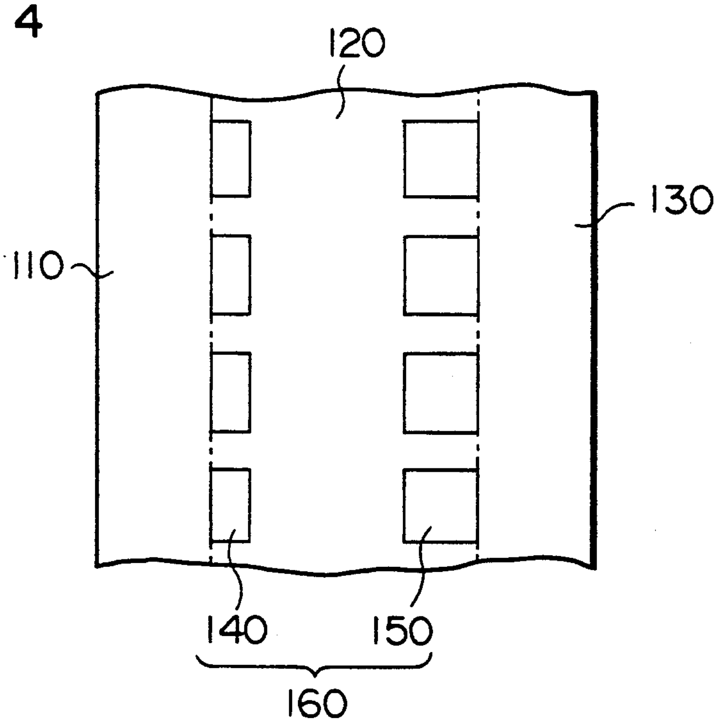
FIG. 4 is a top plan view showing the second embodiment of the present invention.

A sectional view of a configuration of a second embodiment of the present invention is shown in FIG. 3, and a top plan view thereof in FIG. 4. Numeral 100 designates an electrode head, numeral 200 an ink sheet, numeral 300 an image-receiving member, and numeral 400 a recording member including the components 200 and 300. The direction of feeding the ink sheet is shown in FIG. 3.

The ink sheet 200 is comprised of a resistive sheet 210 with a color material layer 220 formed thereon. The resistive sheet 210 makes up a resistive film including a heat-resistant resin mixed with conductive particles such as carbon. This heat-resistive resin is made of such film-formable resin as polyimide, alamide, polycarbonate, polyester, polyphenyl sulfide or polyether ketone. The resistive film is formed into a thickness of about 4 to 15 microns and a surface resistance of about 1 K-ohms.

The color material layer 220 is formed of at least a sublimable dye and a binding resin.

The image-receiving member 300 is comprised of a base sheet 310 with a color development layer 320 laid thereon. The electrode head 100 includes oppositely-aligned electrode trains 160 (numerals 140 and 150 designate electrode trains on recording member insertion side and supply side respectively) embedded in the insulating support members 110, 120, 130 and is formed into a line head. The electrodes are independently or compositely formed of copper, phosphor bronze, tungsten, titanium, brass, chromium or nichrome, and have a resolution of 6 to 16 dots/mm. One of the electrode trains is formed of common electrodes and therefore is not necessarily divided into a plurality of electrodes but may be constructed in an undivided continuous line. The support members are made of such materials as ceramics or glass smaller in friction coefficient and slightly larger in abrasion property than the electrodes. It is important that the thermal diffusion coefficient A of the insulating support member 110 outside of the electrodes on recording member insertion side and the support member 120 inside of the electrodes be smaller than the thermal diffusion coefficient A of the support member 130 outside of the electrodes on recording member supply side. The value A (=k/dc) (k: Heat conductivity, d: Density, c: Specific heat) which is expressed in units of $m^2/s$ is preferably not less than $1\times10^{-6}$ or more preferably not less than $5\times10^{-6}$ for the support member 130, and preferably not more than $5\times10^{-6}$ or more preferably not more than $1\times10^{-6}$ for the support members 110, 120. These support members 110, 120 are made of various glazes, mica glass, glass ceramics, crystallized glass or such minerals as kaolin or talc. Mica glass, in particular, has apparently contradictory superior properties of high wear resistance and low friction coefficient in addition to a small thermal diffusion coefficient. Mica glass may be prepared in various properties by controlling the composition of the fluorine mica contained in glass matrix of $B_2O_3$—$Al_2O_3$—$SiO_2$. (Marketed in the brand name of Macole by Corning)

The material of the support member 130 includes BN or BN-ceramics composite (such as BN—SiN or BN—$Al_2O_3$), ALN or ALN-ceramics composite (such as ALN—BN composite material), alumina, glass ceramics small in glass content, or a solid lubricant.

The electrode head is generally fabricated by a method in which the electrodes 140, 150 are formed in a pattern on the insulating support member 110 or 130 followed by holding the insulating support member 120 held therebetween s a spacer and fixing by an inorganic adhesive.

Now, a method of driving the assembly will be described.

A signal current applied between the electrodes 140 and 150 flows through the resistive layer in the direction parallel to the film thereof. Numeral 230 designates a heat-generating section. The recording conditions attained in the process include a pulse width of 1 ms applied to each dot, a recording period of 4 ms per line and a peak temperature of the heat-generating section of 300° C. to 400° C. According to the present invention, the heat storage in the resistive sheet is balanced with the heat release from the head, thereby producing a high-sensitivity, high-quality image. The ink sheet 200 and the image-receiving member 300 run between the platen and head under this high temperature and a high pressure (5 kg/100 cm). In order to assure effective utilization of the sheet as required, relative-speed recording is effected between the image-receiving paper and the ink sheet. It is experimentally known that in order to permit smooth running and recording between head and sheet, the friction coefficient of 0.2 or less is required at room temperature. In order to promote this condition, the head may be constructed in such a way that the unguent oozes out of the head surface or out of the resistive sheet at high temperatures.

In the case of a movable serial head, an insulating support member corresponding to the member 130 may be considered as a part positioned rearward of the head along the direction of feed thereof.

Another specific example will be described below.

(1) Electrode head: A6-size line head 8 dots/mm in resolution (having a stylus electrode of Cr-Ni), configured of a mica-glass support member 110 outside of the electrode pairs on the recording member insertion side, a mica-glass support member 120 inside of the electrode pairs and an insulating support member 130 made of BN on the recording member exit or feed-out side. The applied pulse width of 1 ms, the recording period of 4 ms/line and the pressure of 5 kg/100 mm. Both uniform-speed and relative-speed recordings are possible. (Relative speed ratio n=1 to 10)

Two types of heads have been test produced: One with the electrodes of all the electrode pairs having the same sectional area and the other with the electrode train on the recording member exit or feed-out side twice as large as that on the recording member insertion side as shown in FIG. 4.

(2) Resistive sheet: The alamide resin is mixed with carbon and is formed into a film having a thickness of 10 microns and a surface resistance of 1 K-ohms.

(3) Color material layer: Composed of solids including, by weight, one part of Indoaniline sublimable dye of cyane and one part of polycarbonate resin, formed into a film having a thickness of 2 microns.

(4) Image-receiving member: Composed of solids including, by weight, one part of polyester resin and 0.2 parts of silica, formed into a thickness of 8 microns on a 100-micron milky PET film.

A recording test conducted under the aforementioned conditions shows that an image is produced by a relative-speed process at a recording cycle of 4 ms/line and a recording energy of 2 $J/cm^2$ free of fog with a smooth gradation recording characteristic. The image thus recorded has a quality equivalent to the one obtained in the dye transfer recording process using a thermal head as a recording means. Also, an A6-size full-color image can be produced within about ten seconds by use of magenta and yellow in addition to the above-mentioned dye. The electrodes having a larger area on supply side are not corroded.

A similar effect is expected of an electrode head according to still another embodiment comprising electrode pairs embedded in opposed relations in insulating support members, in which the thermal diffusion coefficient of the insulating support members inside of the electrode pairs is smaller than that of those outside thereof.

We claim:

1. An electrode head, comprising:

an insulating support structure; and a train of electrode pairs embedded in said insulating support structure, each of said electrode pairs comprising two electrodes disposed in spaced, opposed relationship to one another;

a first portion of said insulating support structure being disposed before said train of electrode pairs relative to a given direction of movement between a recording member and said electrode head, said given direction of movement being substantially normal to a longitudinal orientation of said train of electrode pairs;

a second portion of said insulating support structure being disposed between said two electrodes of each of said electrode pairs of said train;

a third portion of said insulating support structure being disposed after said train of electrode pairs relative to said given direction of movement between said recording member and said electrode head; and said third portion of said insulating support having a higher thermal diffusion coefficient than that of said first portion of said insulating support structure and said second portion of said insulating support structure.

2. An electrode head according to claim 1, wherein the thermal diffusion coefficient of the third portion of the insulating support structure is not less than $1\times10^{-6}$ $m^2/s$.

3. An electrode head according to claim 1, wherein the thermal diffusion coefficient of the first portion of the insulating support structure and the second portion of the insulating support structure is not more than $5\times10^{-6}$ $m^2/s$.

4. An electrode head according to claim 1 or 2, wherein the third portion of the insulating support structure is made of a ceramics material.

5. An electrode head according to claim 1 or 3, wherein the first portion of the insulating support structure and the second portion of the insulating support structure are made of a glass material.

6. A non-impact recording method, comprising:

providing a recording member including an ink sheet having an ink layer thereon and an image receiving member;

providing an electrode head including a train of electrode pairs embedded in an insulating support structure, each of said electrode pairs comprising two electrodes disposed in spaced, opposed relationship to one another;

causing relative movement between said recording member and said electrode head in a given direction of movement substantially normal to a longitudinal orientation of said train of electrode pairs; a first portion of said insulating support structure being disposed before said train of electrode pairs relative to said given direction of movement between said recording member and said electrode head; a second portion of said insulating support structure being disposed between said two electrodes of each of said electrode pairs of said train; a third portion of said insulating support structure being disposed after said train of electrode pairs relative to said given direction of movement between said recording member and said electrode head; and said third portion of said insulating support structure having a higher thermal diffusion coefficient than that of said first portion of said insulating support structure and said second portion of said insulating support structure; and transferring ink from said ink layer to said image receiving member by selectively applying voltages to said electrode pairs.

7. A nonimpact recording method, comprising:

providing a recording member including an ink sheet having an ink layer thereon and an image receiving member;

providing an electrode head including a train of electrode pairs embedded in an insulating support structure, each of said electrode pairs comprising two electrodes disposed in spaced, opposed relationship to one another; and causing relative movement to occur between said recording member and said electrode head in a given direction of movement substantially normal to a longitudinal orientation of said train of electrode pairs; said two electrodes comprising a first electrode disposed on an entrance side of said recording member relative to said given direction of movement between said recording member and said electrode head and a second electrode disposed on an exit side of said recording member relative to said given direction of movement between said recording member and said electrode head; and said first electrode having a smaller cross-sectional area than that of said second electrode viewed in a plane parallel to a recording plane defined by said electrode head.

8. An electrode head, comprising:

an insulating support structure; and a train of electrode pairs embedded in said insulating support structure, each of said electrode pairs comprising two electrodes including a first electrode disposed on an entrance side of a recording medium relative to a given direction of movement between said recording medium and said electrode head during a printing operation and a second electrode disposed on an exit side of said recording member relative to said given direction of movement between said recording medium and said electrode head during a printing operation; and said first electrode having a smaller cross-sectional area than that of said second electrode viewed in a plane parallel to a recording plane defined by said recording head.

* * * * *